Patented Dec. 23, 1941

2,266,794

UNITED STATES PATENT OFFICE 2,266,794

RUBBERLIKE INTERPOLYMERS OF BUTADIENE HYDROCARBONS AND FUMARIC ACID ESTERS AND PROCESS OF PRODUCING THE SAME

Wilhelm Pannwitz, Merseburg, Bernhard Ritzenthaler, Duisburg - Hamborn, Heinrich Hopff and Gustav Steinbrunn, Ludwigshafen-on-the-Rhine, Germany, assignors to I. G. Farbenindustrie Aktiengesellschaft, Frankfort-on-the-Main, Germany No Drawing. Application February 4, 1939, Serial No. 254,540. In Germany February 14, 1938

8 Claims. (Cl. 260—78)

The present invention relates to rubber-like interpolymerization products and a process of producing same.

It has already been proposed to prepare interpolymerization products from maleic or fumaric acid esters and organic compounds having but one unsaturated carbon linkage. In the action of maleic acid esters on compounds having two conjugated carbon double linkages, the so-called dienes, as for example butadiene, condensation takes place with the formation of products of low molecular weight; for example tetrahydrophthalic acid esters are formed from butadiene and maleic acid esters.

We have now found that rubber-like interpolymerization products are obtained by polymerizing in aqueous emulsion mixtures of butadienes, as for example butadiene itself, isoprene dimethyl butadiene and ethylene $\alpha$-$\beta$-dicarboxylic acid esters, such as fumaric or maleic acid esters, and, if desired, other organic compounds capable of being polymerized under the same conditions and having an unsubstituted methylene group bound by a double carbon linkage, especially vinyl compounds, such as vinyl chloride, vinyl esters, acrylic acid or their esters, styrene and vinyl ethers, in the presence of polymerization catalysts, such as oxygen or substances giving off oxygen. The polymerization proceeds best when there is one molecular proportion of butadiene present for each molecular proportion of dicarboxylic acid ester, but larger amounts of butadiene, up to 9 molecular proportions or more, may be polymerized with the fumaric or maleic acid esters.

The polymerization is advantageously carried out at between ordinary temperature and about 80° C.

The interpolymerization products obtained may be used for a great variety of purposes, as for example for oil-proof, vulcanizable cable mixtures or for hoses proof against fuels and oils. Polymerization products having a higher content of butadienes are also suitable for automobile tyres. The polymerization products are especially readily capable of being worked up and in this respect are about equal to masticated natural rubber. They can be vulcanized in the usual manner and worked up together with fillers, especially fillers of fibrous nature, softening agents, dyestuffs and the like.

The following examples will further illustrate how this invention may be carried out in practice, but the invention is not restricted to these examples. The parts are by weight.

*Example 1*

75 parts of fumaric acid diethyl ester and 25 parts of butadiene are emulsified in 100 parts of a 2.5 per cent aqueous solution of the sodium salt of alpha-hydroxy-octodecane sulphonic acid. After adding 0.3 part of potassium persulphate, polymerization is effected at room temperature or somewhat elevated temperature. The polymerization is complete after from 1 to 2 days. The polymerization product precipitated from the resulting dispersion has good stability to cold, oil and water and may readily be worked.

A mixture of 71 parts of fumaric acid diethyl ester, 24 parts of butadiene and 5 parts of acrylic nitrile may be polymerized in the same way. A polymerization product having similar properties is thus obtained.

*Example 2*

77 parts of fumaric acid dibutyl ester and 23 parts of isoprene are emulsified in 100 parts of a 2.5 per cent aqueous solution of Turkey red oil containing 0.5 part of the sodium salt of an alkylated naphthalene sulphonic acid. Polymerization is effected at from 35° to 40° C. after adding 0.5 part of potassium persulphate.

The polymerization product obtained has properties similar to that obtained according to Example 1 and has good elasticity.

*Example 3*

25 parts of fumaric acid diethyl ester and 75 parts of butadiene are emulsified in 100 parts of a 2.5 per cent solution of sodium oleate and polymerization is effected for about 2 days at from 30° to 35° C. after the addition of 0.4 part of potassium persulphate. A rubber is obtained which is suitable for the preparation of automobile tyres.

*Example 4*

1 part of the reaction product from 1 molecular proportion of $\beta,\beta$-dichlordiethyl ether with 2 molecular proportions of the amines prepared from train oil by converting the acids contained therein into the nitriles and reducing the latter is dissolved in a mixture of 76 parts of fumaric acid diethyl ester and 24 parts of butadiene. The mixture is then emulsified in 100 parts of water containing 0.02 part of potassium persulphate and 0.2 part of 30 per cent hydrogen peroxide and the whole stirred for from 15 to 20 hours at from 35 to 40° C. The polymerization product formed is isolated from the resulting dispersion by coagulating and then washed. The yield amounts to about 100 per cent. It can easily be rolled and vulcanized. Its vulcanization products are suitable for the most different purposes, for example in the cable industries, as hoses resistant to mineral oils and gasoline and the like.

Example 5

2.5 parts of the emulsifying agent specified in Example 4 are dissolved in a mixture of 25 parts of fumaric acid diethyl ester and 75 parts of butadiene. The mixture is then polymerized for 24 hours as described in Example 4. An interpolymerization product which is suitable for automobile tyres is obtained in an excellent yield.

The following table shows the properties of some further interpolymerization products according to the present invention:

Table

| Interpolymerization product of— | | | | | |
|---|---|---|---|---|---|
| | | Parts of further polymer- isable compound | Polymerization | | |
| Parts of butadiene | Parts of fumaric acid ester | | Temperature | Time | Properties |
| | | | *Degrees* | | |
| 1.5 butadiene | 3 fumaric acid diethyl ester | 1.5 vinyl chloride | 50 | 2-3 days | Soft elastic sheets, good vulcanizates. |
| 2.8 butadiene | 7.2 fumaric acid diethyl ester | | 40 | ...do.... | Very strong sheets. |
| Do | 4.2 fumaric acid diethyl ester | 3 acrylic nitrile | 40 | 24 hours | Soft sheets, readily to be worked, vulcanizates especially stable to gasoline. |

What we claim is:

1. A process of producing rubber-like interpolymerization products which comprises treating in aqueous emulsion at a temperature ranging between ordinary temperature and about 80° C., a mixture of a fumaric acid ester and a butadiene hydrocarbon with a member selected from the group consisting of oxygen and substances giving off oxygen as a ploymerization catalyst.

2. A process of producing rubber-like interpolymerization products which comprises treating in aqueous emulsion at a temperature ranging between ordinary temperature and about 80° C., a mixture of about 3 parts of fumaric acid diethyl ester and about 1 part of butadiene with a member selected from the group consisting of oxygen and substances giving off oxygen as a polymerization catalyst.

3. A process of producing rubber-like interpolymerization products which comprises treating in aqueous emulsion at a temperature ranging between ordinary temperature and about 80° C., a mixture of a butadiene hydrocarbon, a fumaric acid ester and a vinyl compound with a member selected from the group consisting of oxygen and substances giving off oxygen as a polymerization catalyst.

4. A process of producing rubber-like interpolymerization products which comprises treating in aqueous emulsion at a temperature ranging between ordinary temperature and about 80° C., a mixture of butadiene, fumaric diethyl ester and acrylic nitrile.

5. Rubber-like interpolymerization products of a fumaric acid ester and a butadiene hydrocarbon obtained according to the method of claim 1.

6. Rubber-like interpolymerization products of about 3 parts of fumaric acid diethyl ester and about 1 part of butadiene obtained according to the method of claim 2.

7. Rubber-like interploymerization products of a butadiene hydrocarbon and a fumaric acid ester and a vinyl compound obtained according to the method of claim 3.

8. Rubber-like interpolymerization products of fumaric acid diethyl ester, butadiene and acrylic nitrile obtained according to the method of claim 4.

WILHELM PANNWITZ.
BERNHARD RITZENTHALER.
HEINRICH HOPFF.
GUSTAV STEINBRUNN.